United States Patent [19]
Mondet et al.

[11] Patent Number: 6,032,899
[45] Date of Patent: Mar. 7, 2000

[54] BLADE PITCH LOCKING DEVICE FOR A MAIN ROTOR OF A ROTARY-WING AIRCRAFT

[75] Inventors: Jean Joseph Henri Mondet, Pelissanne; Gilbert Jean Mestre, Marignane, both of France

[73] Assignee: Eurocopter, France

[21] Appl. No.: 09/114,233

[22] Filed: Jul. 2, 1998

[30] Foreign Application Priority Data

Jul. 7, 1997 [FR] France .................................. 97 08597

[51] Int. Cl.⁷ ................................................ B64C 11/28
[52] U.S. Cl. ................................ 244/17.25; 244/17.27; 244/39; 416/142; 416/143
[58] Field of Search .................................. 416/142, 143; 244/17.11, 17.27, 39, 17.25

[56] References Cited

U.S. PATENT DOCUMENTS

| | | | |
|---|---|---|---|
| 3,765,794 | 10/1973 | Kudasch et al. | 416/143 |
| 3,982,648 | 9/1976 | Luedtke et al. | 214/776 |
| 4,284,387 | 8/1981 | Ferris | 416/134 A |
| 4,436,483 | 3/1984 | Watson | 416/143 |
| 5,192,180 | 3/1993 | Kolleth | 414/719 |
| 5,322,415 | 6/1994 | White et al. | 416/143 |

FOREIGN PATENT DOCUMENTS

94 11245  5/1994  European Pat. Off. .

OTHER PUBLICATIONS

U.S application No. 08/953,985, filed Oct. 20, 1997.

*Primary Examiner*—J. Woodrow Eldred
*Attorney, Agent, or Firm*—Piper Marbury Rudnick & Wolfe

[57] ABSTRACT

The present invention relates to a device for locking the pitch of the blades of a main rotor of a rotary-wing aircraft in which each blade is firstly rotated about an axis of rotation of the rotor by a rotor mast and is secondly constrained to pivot about a longitudinal pitch axis of the blade together with a pitch lever which is controlled by a pitch link connected to a rotary plate rotating with the rotor mast and belonging to a cyclic swash plate mechanism in which the rotary plate is rotatably mounted on a non-rotary plate capable of sliding axially along said rotor mast and of tilting in any direction relative to the rotor mast under the drive of at least three servo-controls each comprising a body fixed on a support secured to the aircraft and a rod having a free end secured to the non-rotary plate. The device includes immobilization means for holding the rod of each of the servo-controls relative to the corresponding body so as to lock the blades in a predetermined pitch position.

7 Claims, 4 Drawing Sheets

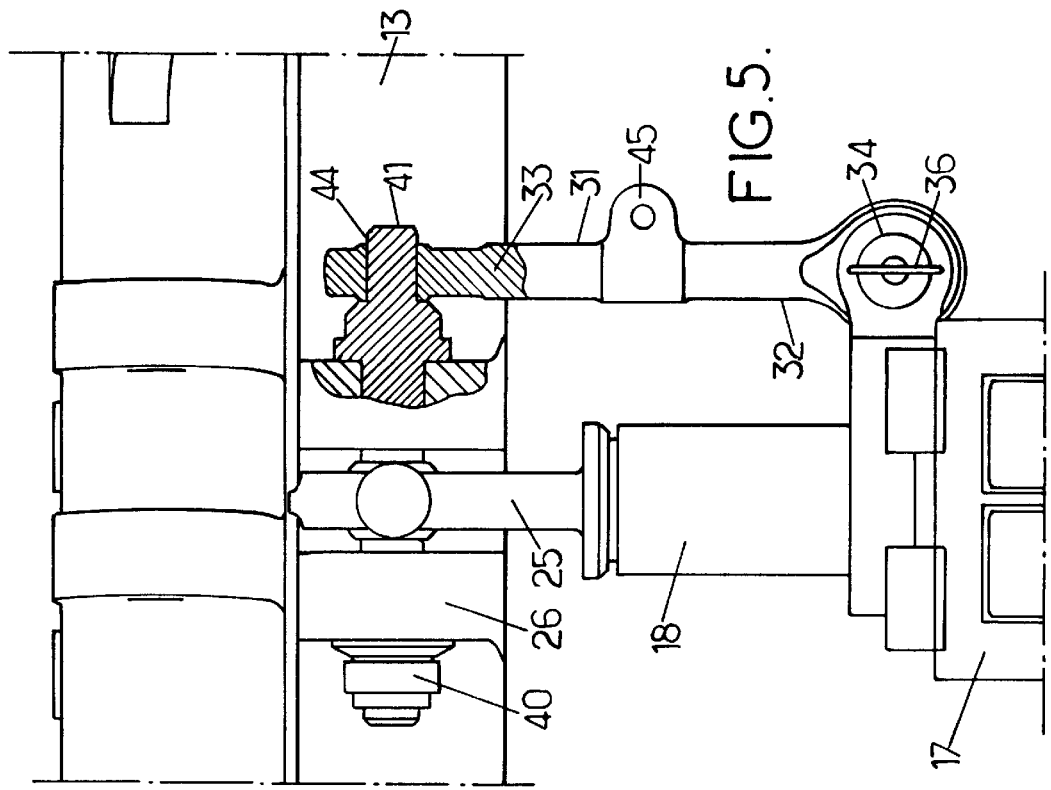
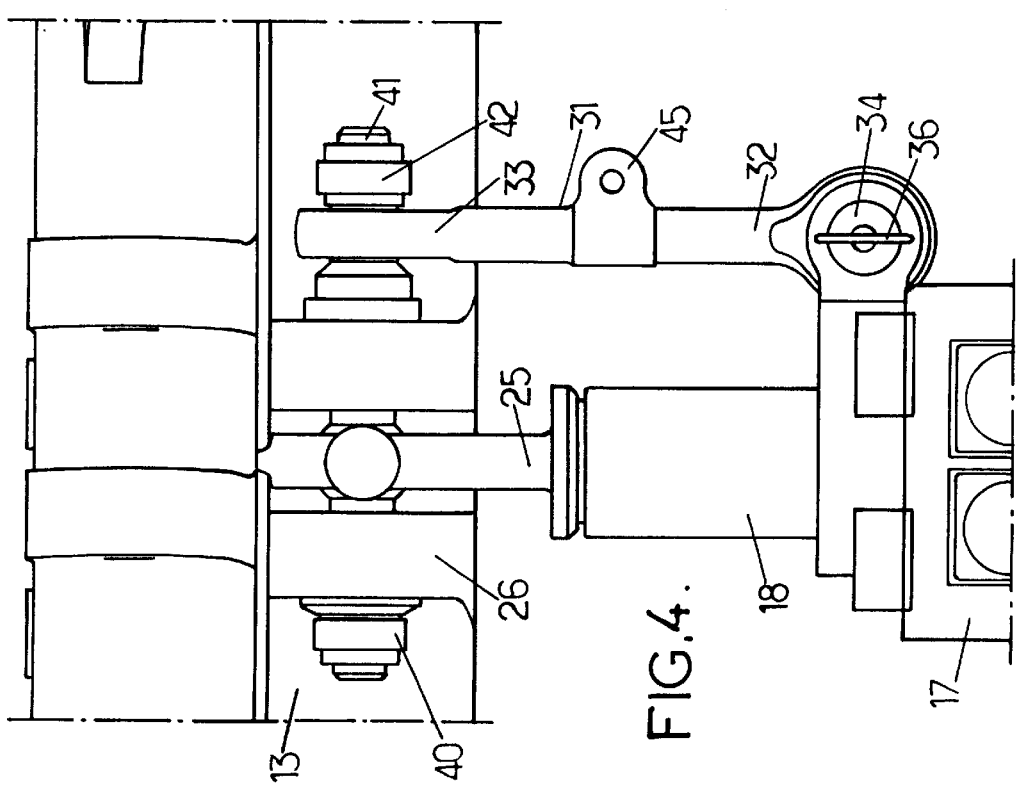

BLADE PITCH LOCKING DEVICE FOR A MAIN ROTOR OF A ROTARY-WING AIRCRAFT

FIELD OF THE INVENTION

The present invention relates to a device for locking the pitch of the blades of a main rotor of a rotary-wing aircraft in which each blade is firstly rotated about an axis of rotation of the rotor by a rotor mast and is secondly constrained to pivot about a longitudinal pitch axis of the blade together with a pitch lever which is controlled by a pitch link connected to a rotary plate rotating with the rotor mast and belonging to a cyclic swash plate mechanism in which the rotary plate is rotatably mounted on a non-rotary plate capable of sliding axially along said rotor mast and of tilting in any direction relative to the rotor mast under the drive of at least three servo-controls each comprising a body fixed on a support secured to the aircraft and a rod having a free end secured to the non-rotary plate.

BACKGROUND OF THE INVENTION

The main rotor of a rotary-wing aircraft, in particular a helicopter, is generally rather large, which makes it difficult to save space on a parking area, or on the deck of a ship for an on-board helicopter, or indeed when stored in a hangar. To reduce this size, a helicopter is typically fitted with a main rotor in which each blade can be folded back.

Nevertheless, each blade is secured to the rotor mast via a member generally known as a link sleeve fixed to an element of the rotor mast known as the hub. The sleeve is itself connected to the hub by retaining-and-hinge means enabling the blade to perform angular motion in pitch, in flapping, and in drag as required for proper operation of the main rotor assembly.

In contrast, when the blades are being folded back, such angular motion, and in particular the pitch motion must be inhibited.

Otherwise, the blade and its sleeve tilts about the pitch-changing axis of the blade, constituting a swinging mass. Such tilting can be dangerous for personnel in the vicinity of the helicopter and for the corresponding blade retaining-and-hinge means which can be damaged. In addition, it is necessary to lock blade pitch in order to be able to perform repeated folding operations with the necessary accuracy.

Furthermore, gusts of wind or motion of the ship on which the helicopter is located can cause said swinging masses to move, thereby running the risk of damaging the component parts of the rotor, and this can also be dangerous for personnel.

Solutions have already been proposed for mitigating those drawbacks. In those solutions, pitch locking is obtained by disconnecting all of the pitch links from the pitch levers, giving rise, amongst other things, to the pitch setting of the blades being taken out of adjustment. Proposals have also made in French patent application FR-96/12817 filed in the name of the Applicant to lock the swash plate relative to the hub by means of tooling links.

OBJECTS AND SUMMARY OF THE INVENTION

An object of the invention is to remedy the above-mentioned drawbacks by providing a blade pitch locking device for the main rotor of a helicopter, which device is simple, effective, and of low cost.

To this end, the invention provides a blade pitch locking device for a main rotor of a rotary-wing aircraft of the kind specified above, essentially including immobilization means for holding the rod of each of the servo-controls relative to the corresponding body so as to lock the blades in a predetermined pitch position.

Thus, all three servo-controls are locked and together they prevent any movement of the pitch links which therefore hold the swinging masses in an accurate pitch position.

The device of the invention may optionally further include one or more of the following characteristics:

the immobilization means comprise at least three tooling links designed to be put into place and interposed between each of the bodies of the servo-controls and the non-rotary plate;

the body of each servo-control includes a fork in which a first end of the corresponding tooling link is secured by means of a ball pin;

the free end of the rod of each servo-control is fixed in a fork carried by the non-rotary plate and the second end of the corresponding tooling link is held in an extension of said fork by means of a ball pin;

the free end of the rod of each servo-control is fixed in a fork carried by the non-rotary plate by means of a bolt, and the second end of the corresponding tooling link is held to the non-rotary plate by engaging on an extension of said bolt, outside the fork of the non-rotary plate;

a nut is put into place on the extension of the bolt to hold the second end of the tooling link positively in place; and the immobilization means comprise a tooling link having a first end held on a fork carried by the body of each servo-control, and having a second end which, in a rest position, is fixed on the body of the servo-control, and in an active position for locking the pitch of the blades is held on the non-rotary plate.

BRIEF DESCRIPTION OF THE DRAWINGS

Three embodiments of the invention are described below with reference to the accompanying drawings, in which:

FIG. 4 is a side view of the FIG. 3 blade-pitch locking device; and

FIG. 5 is a side view of a third embodiment of the blade-pitch locking device.

MORE DETAILED DESCRIPTION

Figure 1:
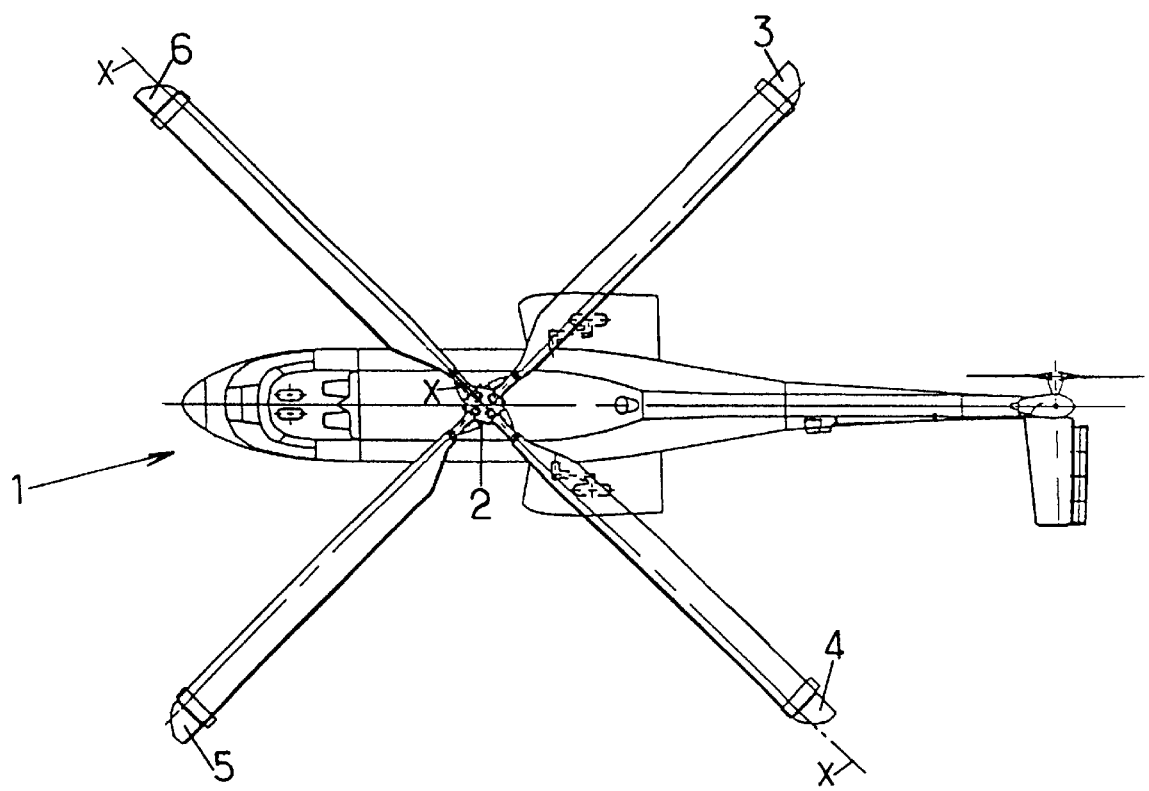
FIG. 1 is a plan view of a helicopter provided with a foldable-blade rotor fitted with a pitch locking device of the present invention, the blades being shown in the deployed position for flight.

A rotary-wing aircraft 1, such as a helicopter, is shown in FIG. 1 and is fitted with a main rotor 2 which rotates four blades 3 to 6.

Each of said blades is rotated about an axis of rotation A—A of the rotor mast 2 by means of a hub 7. In conventional manner each of the blades 3 to 6 is linked to the hub 7 by a link sleeve 8 having the root of the blade fixed thereto.

Each sleeve 8 is itself connected to the hub 7 by retaining-and-hinge means making pitch and flapping rotary motion possible as is known to the person skilled in the art, and also making drag rotary motion possible of the corresponding blade together with its sleeve 8 relative to the hub 7.

Figure 2:
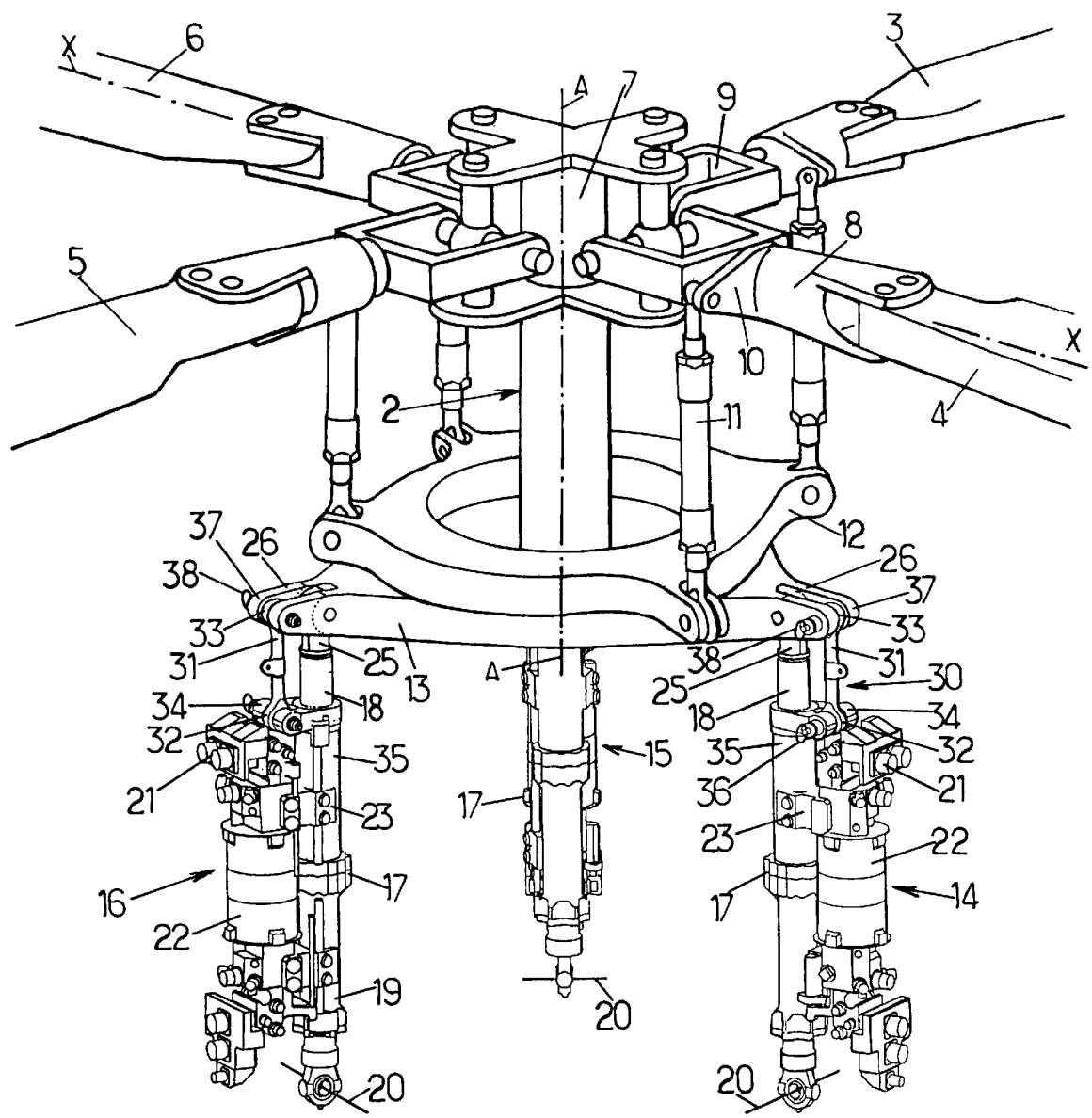
FIG. 2 is a perspective view of a rotor head fitted with a blade-pitch locking device constituting a first embodiment of the present invention.

As shown diagrammatically in FIG. 2, the retaining-and-hinge means 9 may be hinges suitable for pivoting about three perpendicular axes in pairs, or may comprise at least one spherical laminated bearing of any known type. Such a bearing comprises a central portion made up of an alternating stack of elastically deformable layers and of rigid cups in the form of spherical caps, disposed between an external radial strength member fixed to the hub 7 and an internal radial strength member fixed to the radially inner end of the sleeve 8.

Each blade is also constrained to rotate about its longitudinal pitch axis X—X with a pitch lever 10. The pitch lever 10 is controlled by a pitch link 11, itself connected to a rotary plate 12 rotating with the rotor mast 2. The rotary plate 12 is a component of a cyclic swash plate mechanism.

In this cyclic swash plate mechanism, the rotary plate 12 is rotatably mounted on a non-rotary plate 13. The non-rotary plate 13 can slide axially along the rotor mast 2 parallel to the axis A—A and it can be tilted in any direction relative to said rotor mast (the bottom portion of which is not shown for reasons of clarity). The non-rotary plate is also known as the "fixed cyclic plate".

In addition, the non-rotary plate 13 tilts in any direction relative to the rotor mast 2 under drive from a control system actuated by a helicopter pilot using a collective pitch control stick and a cyclic pitch control stick (not shown) with only three servo-controls 14 to 16 of the system connected to the non-rotary plate 13 being shown.

The three servo-controls 14 to 16 serve to control the movement of the non-rotary plate 13 in all directions about the axis A—A of the rotor mast 2.

Each servo-control 14 to 16 is constituted in conventional manner by a body 17 in which a rod 18 moves vertically in either direction.

The bottom portion 19 of the body 17 is secured to a support 20 that does not move relative to the helicopter 1. By way of example, the support 20 is constituted by the top portion of an engine compartment (not shown) of the helicopter.

In conventional manner, the body 17 is constituted by an electrical control stage 21, a hydraulic control stage 22, and a hydraulic power stage 23.

The rod 18 has a free top end 25 which is secured to the non-rotary plate 13 in a fork 26. The back-and-forth motion of the rod 18 in the body 17 serves to determine the tilt of the non-rotary plate 13 in any direction relative to the rotor mast 2.

When folding back the blades, in order to ensure that the blades are locked in a predetermined pitch position, the rotor mast 2 is fitted with a pitch locking device which comprises immobilizing means 30 for holding the rod 18 of each of the servo-controls 14 to 16 in position relative to the corresponding body 17.

These immobilizing means 30 comprise three tooling links 31 each designed to be placed and interposed between the non-rotary plate 13 and a respective body 17 of the three servo-controls 14 to 16.

Each tooling link 31 has a bottom first end 32 and a top second end 33. The first end 32 is fixed in a fork 34 carried by the top portion 35 of the body 17 remote from the bottom portion 19 of the body. The bottom end 32 of the link 31 is held in the fork 34 by a ball pin 36, but in a variant, this end can naturally be held by any other equivalent means known to the person skilled in the art.

The three embodiments of the locking device of the present invention shown in FIGS. 1 to 5 differ from one another solely in the way the top end 33 of each tooling link 31 is fixed. Consequently, the elements that are common to all of the embodiments are given identical references in the drawings.

In the first embodiment as shown in FIG. 2, the second end 33 of the tooling link 31 is held vertically above the fork 34 in an extension 37 of the fork 26 holding the free end 25 of the rod 18. The second end 33 of the link 31 is fixed in the extension 37 by a ball pin 38.

When it is desired to lock the blade pitch so as to fold back the blades 3 to 6, an operative puts the three tooling links 31 into place by placing their bottom ends 32 in the forks 34 and their top ends 33 in the extensions 37 of the forks 26. It then suffices to prevent these ends from moving relative to the forks by inserting the ball pins 36 and 38. The free ends 25 of the rods 18 of the servo-controls 14 to 16 are thus immobilized relative to the bodies 17 of the servocontrols. This makes it possible to immobilize the non-rotary plate 13 and thus to immobilize the cyclic swash plate mechanism 12, 13, thereby ensuring that blade pitch is fixed by means of the pitch links.

Figure 3:
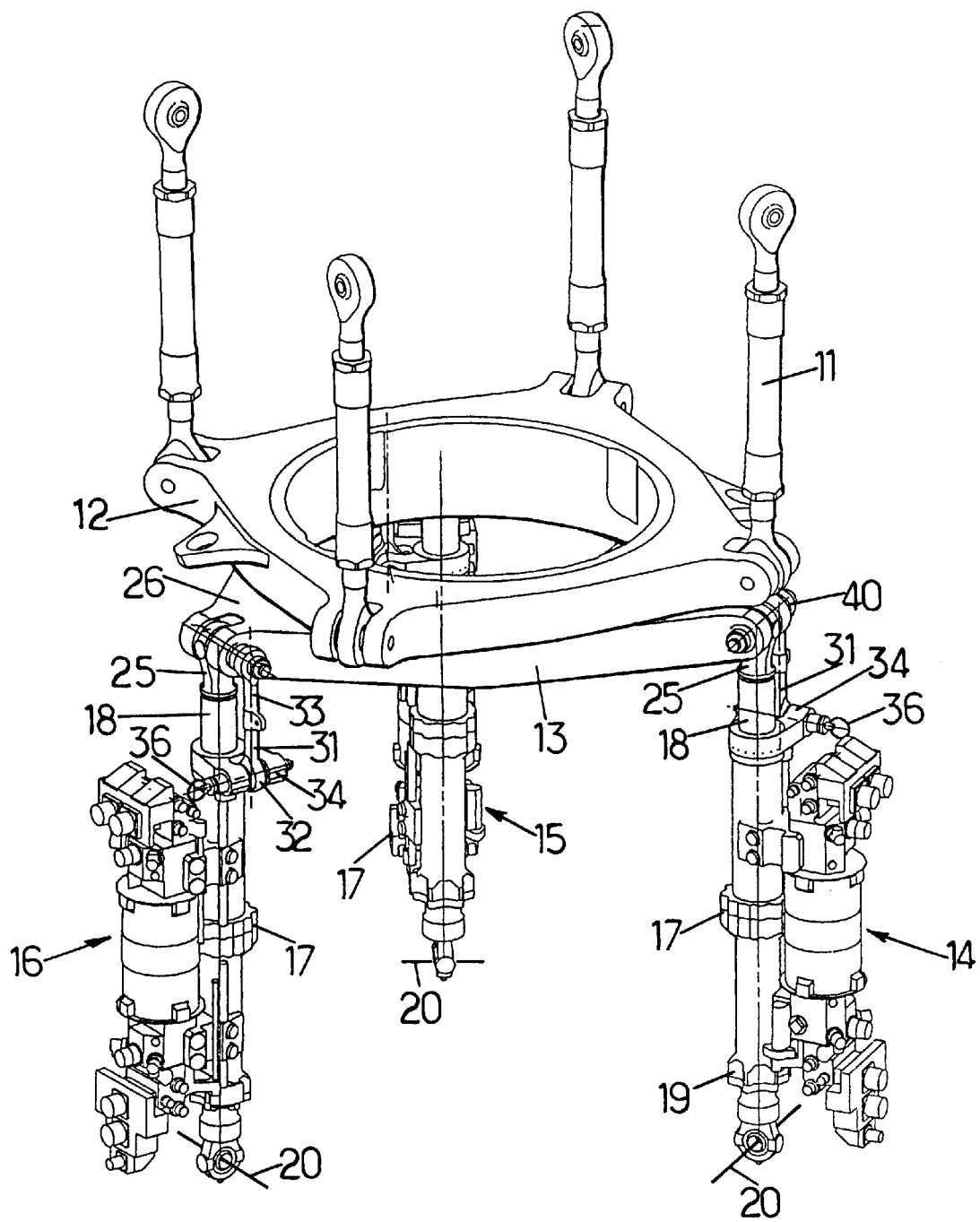
FIG. 3 is a fragmentary perspective view of the bottom portion of the rotor head shown in FIG. 2 and fitted with a second embodiment of a blade-pitch locking device of the present invention.

In the second embodiment of the device of the present invention, as shown in FIGS. 3 and 4, the free end 25 of the rod 18 of each servo-control 14 to 16 is still held in the fork 26 carried by the non-rotary plate 13, with this being done by a bolt 40.

The fork 34 for holding the bottom end 32 of the tooling link 31 is situated in this example vertically below one of the ends 41 of the bolt 40. In order to hold the second end 33 of the tooling link 31 stationary in order to lock blade pitch, this second end 33 is engaged onto the end 41 of the bolt 40 and it is held in position by screwing a nut 42 onto the free end 41 of the bolt 40.

The third embodiment in FIG. 5 differs from the second embodiment shown in FIGS. 3 and 4 solely in that the nut 42 is not fitted to the end 41 of the bolt 40. The end 41 of the bolt 40 in this embodiment has a bearing surface 44 of tolerance suitable for accurately immobilizing the second end 33 of the tooling link 31. When locking blade pitch, the second end 33 of the link 31 is initially immobilized on the end 41 of the bolt 40, and then the first end 32 of the link is immobilized in its fork 34 by means of the ball pin 36.

As a safety measure, the presence of the tooling links 31 is signalled by a streamer (not shown) designed to be fixed to a streamer-fastening ring 45 provided on each of the links 31.

In a variant, the tooling links 31 can be permanently carried by the servo-controls 14 to 16. The first end 32 of each link 31 is then permanently fixed in the fork 34 carried by the body 17 of each servo-control. When not locking blade pitch, the link 31 is secured to the body 17, e.g. via the electrical control stage 21. Finally, when it is desired to lock pitch, the link 31 is moved into a substantially vertical position to cause the second end 33 of the link to co-operate with the fork 26 of the non-rotary plate 13.

We claim:

1. A device for locking the pitch of the blades of a main rotor of a rotary-wing aircraft in which each blade is firstly rotated about an axis of rotation of the rotor by a rotor mast and is secondly constrained to pivot about a longitudinal pitch axis of the blade together with a pitch lever which is controlled by a pitch link connected to a rotary plate rotating with the rotor mast and belonging to a cyclic swash plate mechanism in which the rotary plate is rotatably mounted on a non-rotary plate capable of sliding axially along said rotor mast and of tilting in any direction relative to the rotor mast under the drive of at least three servo-controls each comprising a body fixed on a support secured to the aircraft and a rod having a free end secured to the non-rotary plate, the device including immobilization means for holding the rod of each of the servo-controls relative to the corresponding body so as to lock the blades in a predetermined pitch position.

2. A device according to claim 1, wherein the immobilization means comprise at least three tooling links designed to be put into place and interposed between each of the bodies of the servo-controls and the non-rotary plate.

3. A device according to claim 2, wherein the body of each servo-control includes a fork in which a first end of the corresponding tooling link is secured by means of a ball pin.

4. A device according to claim 3, wherein the free end of the rod of each servo-control is fixed in a fork carried by the non-rotary plate and the second end of the corresponding tooling link is held in an extension of said fork by means of a ball pin.

5. A device according to claim 3, wherein the free end of the rod of each servo-control is fixed in a fork carried by the non-rotary plate by means of a bolt, and the second end of the corresponding tooling link is held to the non-rotary plate by engaging on an extension of said bolt, outside the fork of the non-rotary plate.

6. A device according to claim 5, wherein a nut is put into place on the extension of the bolt to hold the second end of the tooling link positively in place.

7. A device according to claim 1, wherein the immobilization means comprise a tooling link having a first end held on a fork carried by the body of each servo-control, and having a second end which, in a rest position, is fixed on the body of the servo-control, and in an active position for locking the pitch of the blades is held on the non-rotary plate.

\* \* \* \* \*